(12) United States Patent
Miyatake et al.

(10) Patent No.: US 8,281,094 B2
(45) Date of Patent: Oct. 2, 2012

(54) REMOTE COPY SYSTEM

(75) Inventors: Yoshifumi Miyatake, Odawara (JP);
Takuya Ichikawa, Yokohama (JP);
Katsuhiro Okumoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 393 days.

(21) Appl. No.: 12/669,475

(22) PCT Filed: Aug. 26, 2009

(86) PCT No.: PCT/JP2009/004148
§ 371 (c)(1),
(2), (4) Date: Jan. 15, 2010

(87) PCT Pub. No.: WO2011/024221
PCT Pub. Date: Mar. 3, 2011

(65) Prior Publication Data
US 2012/0137092 A1  May 31, 2012

(51) Int. Cl.
*G06F 12/00* (2006.01)
*G06F 7/00* (2006.01)
*G06F 17/00* (2006.01)
(52) U.S. Cl. ........ 711/162; 707/640; 707/641; 707/645; 707/650; 707/655; 711/161
(58) Field of Classification Search .................. 711/161, 711/162; 707/640, 641, 645, 650, 655, 658, 707/662, 676, 679, 689
See application file for complete search history.

(56) References Cited

U.S. PATENT DOCUMENTS

| 6,105,078 | A | * | 8/2000 | Crockett et al. ................. 710/18 |
| 2006/0031646 | A1 | | 2/2006 | Maruyama et al. |
| 2007/0255916 | A1 | * | 11/2007 | Hiraiwa et al. ................. 711/162 |
| 2008/0148105 | A1 | * | 6/2008 | Hisatomi et al. ................. 714/47 |
| 2008/0201527 | A1 | * | 8/2008 | Suzuki et al. ................. 711/114 |
| 2008/0301386 | A1 | | 12/2008 | Matsui et al. |
| 2009/0106400 | A1 | | 4/2009 | Maruyama et al. |
| 2010/0179959 | A1 | * | 7/2010 | Shoens ........................ 707/758 |
| 2011/0078494 | A1 | * | 3/2011 | Maki et al. ................... 714/6.12 |

FOREIGN PATENT DOCUMENTS

JP 2006-318505 11/2006
* cited by examiner

*Primary Examiner* — Kevin Ellis
*Assistant Examiner* — Mehdi Namazi
(74) *Attorney, Agent, or Firm* — Foley & Lardner LLP

(57) ABSTRACT

When performing asynchronous remote copying, whether or not a disaster has occurred at a main site is judged at a remote site; and if the disaster has occurred, recovery processing is immediately started at the remote site. When asynchronous remote copying is performed between a controller and a controller, the controller transfers remote copy target data in a storage apparatus and command information via a remote copy channel to the controller; and after receiving the remote copy target data, the controller stores the remote copy target data in a storage apparatus; and if the controller fails to receive the command information within a set time period, the controller judges that a disaster has occurred, and then outputs the judgment result to a backup center server; and the backup center server executes recovery processing based on data in the storage apparatus when the disaster has occurred.

13 Claims, 11 Drawing Sheets

FIG.2

| MANAGEMENT NUMBER | WORK GROUP NUMBER | VOLUME NUMBER | VOLUME STATUS | WORK GROUP STATUS | READ/WRITE PERMISSION STATUS |
|---|---|---|---|---|---|
| ① | 0-0 | VOLUME #1 | UNCERTAIN → THE ORDER EXISTS: "SUSPENDED GROUP" | UNCERTAIN → ORDER-GUARANTEED GROUP | UNPERMITTED |
| ② | 0-1 | VOLUME #2 | UNCERTAIN → THE ORDER EXISTS: "SUSPENDED GROUP" | | UNPERMITTED |
| ③ | 1-0 | VOLUME #3 | UNCERTAIN → THE ORDER EXISTS: "SUSPENDED GROUP" | UNCERTAIN → ORDER-NONGUARANTEED GROUP | UNPERMITTED |
| ④ | 1-1 | VOLUME #4 | UNCERTAIN → THE ORDER DOES NOT EXIST: "SUSPENDED VOLUME" | | UNPERMITTED |
| ⑤ | 1-2 | VOLUME #5 | UNCERTAIN → THE ORDER EXISTS: "SUSPENDED GROUP" | | UNPERMITTED |
| .. | .. | .. | .. | | .. |
| MAXn | n-n | VOLUME #n | UNCERTAIN → THE ORDER EXISTS: "SUSPENDED GROUP" | UNCERTAIN → ORDER-GUARANTEED GROUP | UNPERMITTED |

FIG.3

| MANAGEMENT NUMBER | WORK GROUP NUMBER | VOLUME NUMBER | VOLUME STATUS | WORK GROUP STATUS | READ/WRITE PERMISSION STATUS |
|---|---|---|---|---|---|
| ① | 0-0 | VOLUME #1 | THE ORDER EXISTS: "SUSPENDED GROUP" | ORDER-GUARANTEED GROUP | UNPERMITTED →PERMITTED |
| ② | 0-1 | VOLUME #2 | THE ORDER EXISTS: "SUSPENDED GROUP" | | UNPERMITTED →PERMITTED |
| ③ | 1-0 | VOLUME #3 | THE ORDER EXISTS: "SUSPENDED GROUP" | ORDER-NONGUARANTEED GROUP | UNPERMITTED |
| ④ | 1-1 | VOLUME #4 | THE ORDER DOES NOT EXIST: "SUSPENDED VOLUME" | | UNPERMITTED |
| ⑤ | 1-2 | VOLUME #5 | THE ORDER EXISTS: "SUSPENDED GROUP" | | UNPERMITTED |
| ... | ... | ... | ... | | ... |
| MAXn | n-n | VOLUME #n | THE ORDER EXISTS: "SUSPENDED GROUP" | ORDER-GUARANTEED GROUP | UNPERMITTED →PERMITTED |

REMOTE COPY DATA ORDER CHECK SCREEN — 200

| WORK GROUP NUMBER | INTENDED USE | ORDER GUARANTEE (GUARANTEED / NONGUARANTEED) | | DATA-GUARANTEED TIME (yymmdd:hhmmss) | WORK GROUP NUMBER | INTENDED USE | ORDER GUARANTEE (GUARANTEED / NONGUARANTEED) | | DATA-GUARANTEED TIME (yymmdd:hhmmss) |
|---|---|---|---|---|---|---|---|---|---|
| 00 | A SYSTEM BACKBONE | O | – | 2009/05/25 20:15:32 | 10 | A SYSTEM DEVELOPMENT | O | – | 2009/05/25 20:15:32 |
| 01 | B SYSTEM BACKBONE | O | – | 2009/05/25 20:15:32 | 11 | B SYSTEM DEVELOPMENT | – | O | – |
| 02 | NONE | – | – | – | 12 | NONE | – | – | – |
| 03 | NONE | – | – | – | 13 | NONE | – | – | – |
| 04 | NONE | – | – | – | 14 | NONE | – | – | – |
| 05 | NONE | – | – | – | 15 | NONE | – | – | – |
| 06 | NONE | – | – | – | 16 | NONE | – | – | – |
| 07 | NONE | – | – | – | 17 | NONE | – | – | – |
| 08 | NONE | – | – | – | 18 | NONE | – | – | – |
| 09 | NONE | – | – | – | 19 | NONE | – | – | – |
| 0A | NONE | – | – | – | 1A | NONE | – | – | – |
| 0B | NONE | – | – | – | 1B | NONE | – | – | – |
| 0C | NONE | – | – | – | 1C | NONE | – | – | – |
| 0D | NONE | – | – | – | 1D | NONE | – | – | – |
| 0E | NONE | – | – | – | 1E | NONE | – | – | – |
| 0F | NONE | – | – | – | 1F | NONE | – | – | – |

202  204  206  208  210    212  214  216  218  220

Next    Close

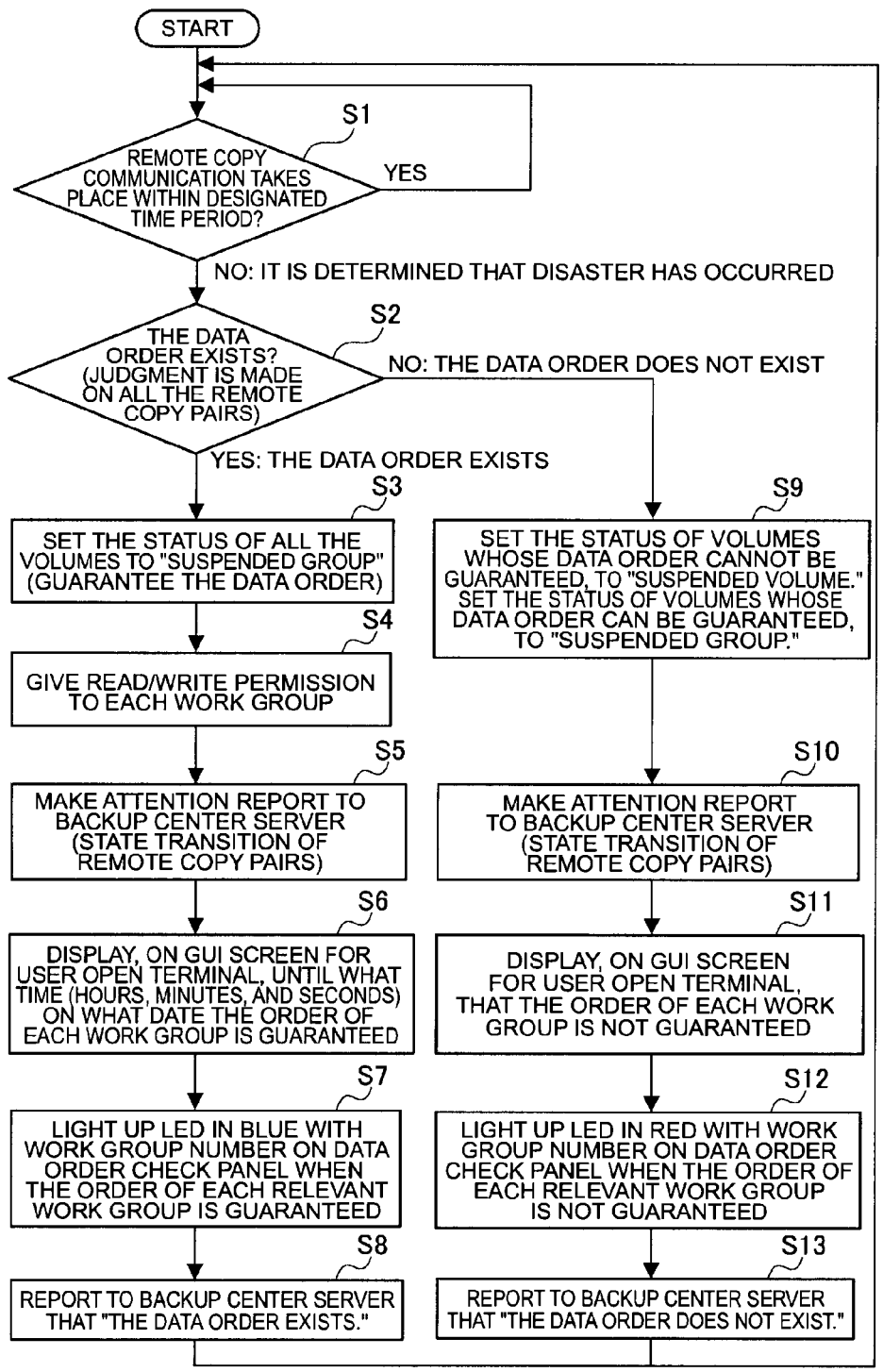

US 8,281,094 B2

REMOTE COPY SYSTEM

CROSS-REFERENCE TO RELATED APPLICATION

This application is the National Phase of International Patent Application No. PCT/JP2009/004148, filed Aug. 26, 2009. The contents of that application is incorporated herein by reference in its entirety.

TECHNICAL FIELD

The present invention relates to a technique of copying data in a storage apparatus located at a main site to a storage apparatus located at a remote site.

BACKGROUND ART

Recently, disaster recovery of a storage system has drawn attention. A known technique for realizing the disaster recovery is a remote copy system for copying data in a storage apparatus installed at a main site to a storage apparatus installed at a remote site, without sending the data through a host computer.

There are two types of remote copying. One type is synchronous remote copying whereby in synchronization with making update data for a duplication source volume from a host computer reflected in the duplication source volume, the update data is also reflected in a duplication destination volume.

Another type is asynchronous remote copying whereby a buffer for temporarily storing update data is provided at both a main site and a remote site; after storing update data for a duplication source volume from a host computer in the buffer at the main site, the update data is reflected in the duplication source volume; and the update data stored in the buffer for the main site is stored in the buffer for the remote site asynchronously and the pieces of update data stored in the buffer for the remote site are sorted in the update order at the main site and then written to a duplication destination volume. Incidentally, the duplication source volume is a primary volume constituting a copy pair with the duplication destination volume, and the duplication destination volume is a secondary volume of the copy pair.

If the remote copy system is used and a disaster occurs at the main site, processing executed at the main site can be continuously performed at the remote site by using data in the storage apparatus installed at the remote site. Furthermore, a system is suggested for sending data in the storage apparatus at the main site to a third storage apparatus located at a third site and then sending the data in the third storage apparatus located at the third site to the remote site if the main site suffers from a disaster (see Patent Document 1). Incidentally, examples of systems related to this type of technology include: a system for which data consistency between sites is guaranteed (see Patent Document 2); a system for which replica data whose time order is guaranteed is prepared, wherein the system can be restored by using the replica data when a failure has occurred at a remote site (see Patent Document 3); and a system for which the update order of data copied from a main site can be secured among a plurality of secondary volumes at a remote site even if the plurality of secondary volumes at the remote site exist and extend across a plurality of storage subsystems (see Patent Document 4).

CITATION LIST

Patent Literature

PTL 1: Japanese Patent Application Laid-Open Publication No. 2006-318505;
PTL 2: Japanese Patent Application Laid-Open Publication No. 2005-267216;
PTL 3: Japanese Patent Application Laid-Open Publication No. 2006-79568; and
PTL 4: Japanese Patent Application Laid-Open Publication No. 2008-299789.

SUMMARY OF INVENTION

Technical Problem

Since the conventional technique employs the configuration in which data in the storage apparatus located at the main site is previously sent to the third storage apparatus located at the third site, even if the main site suffers from a disaster, processing can be immediately resumed at the remote site. However, no consideration is given to immediately detecting the occurrence of a disaster at the main site.

Specifically speaking, when communication between the main site and the remote site can no longer be performed, whether a failure has occurred in a communication line or a disaster has occurred at the main site is checked by telephone in the case of the conventional art. Therefore, it is impossible to immediately detect the occurrence of a disaster.

In particular, if the system is configured so that an operator operates a terminal to check whether the data order of a disk volume group is guaranteed or not, and if communication between the main site and the remote site can no longer be performed during remote copying, the operator needs to cancel the remote copying. Therefore, it takes time to check the occurrence of a disaster and the recovery processing may not be executed immediately.

The present invention was devised in light of the above-described problems of the conventional art. It is an object of the invention to provide a remote copy system and remote copy method for judging, at a remote site, whether or not a disaster has occurred at a main site, based on communication during asynchronous remote copying, wherein if the disaster has occurred, the remote copy system and the remote copy method make it possible to start recovery processing at the remote site.

In order to achieve the above-described object, the present invention is designed so that when performing asynchronous remote copying between a first controller located at a main site and a second controller located at a remote site, command information including a heart-beat signal is sent and received between the first controller and the second controller; and if the second controller fails to receive first command information sent from the first controller to the second controller within a set time period, the second controller judges that a disaster has occurred at the main site, and then outputs the judgment result to a backup center server; and the backup center server executes recovery processing.

Solution to Problem

According to the present invention, the occurrence of a disaster at a main site can be automatically detected at a remote site; and when a disaster is detected, the recovery processing can be started at the remote site.

BRIEF DESCRIPTION OF DRAWINGS

FIG. 2 is a configuration diagram of a data order management table;

FIG. 3 is a configuration diagram of another data order management table;

FIG. 5 shows an example of display on a remote copy data order check screen;

FIG. 11 is a flowchart illustrating processing executed by the channel processor at the remote site.

DESCRIPTION OF EMBODIMENTS

An embodiment of the present invention will be described below with reference to the attached drawings.

This embodiment is designed so that when performing asynchronous remote copying between a main site and a remote site, command information including a heart-beat signal is sent and received between the main site and the remote site; and if the command information sent from the main site cannot be received at the remote site within a set time period, it is judged that a disaster has occurred at the main site, and this judgment result is then output to a backup center server; and the backup center server executes recovery processing.

Figure 1:
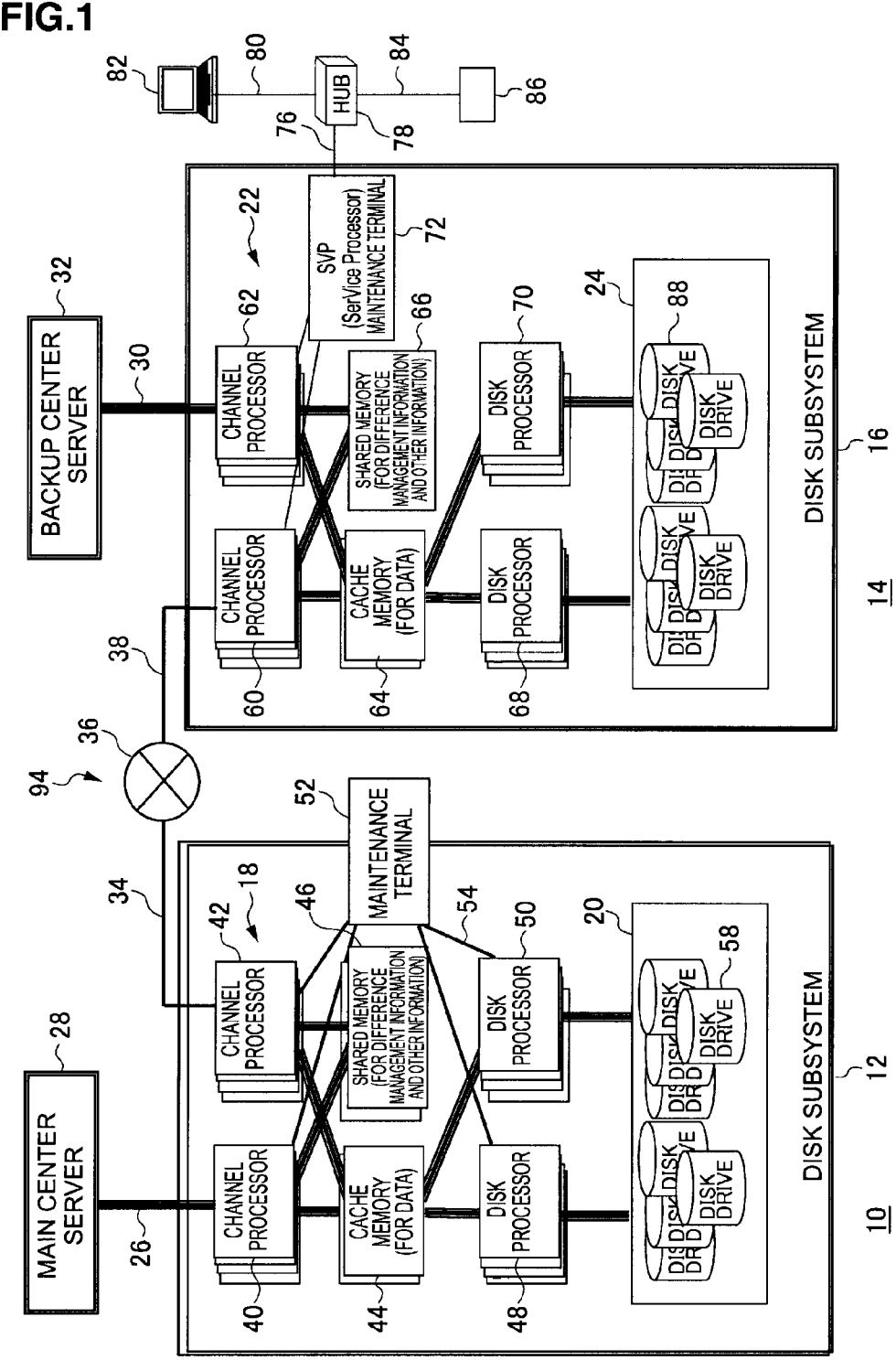
FIG. 1 is a block configuration diagram of a remote copy system according to an embodiment of the present invention.

FIG. 1 is a block diagram of a remote copy system according to an embodiment of the present invention. Referring to FIG. 1, the remote copy system includes a disk subsystem 12 located at a main site 10 and a disk subsystem 16 located at a remote site 14 and is configured to be capable of performing asynchronous remote copying between the disk subsystem 12 and the disk subsystem 16.

The disk subsystem 12 serving as a first storage subsystem includes a controller 18 and a storage apparatus 20. The disk subsystem 16 serving as a second storage subsystem includes a controller 22 and a storage apparatus 24. The controller 18 is connected via a network 26 to a main center server 28, and the controller 22 is connected via a network 30 to a backup center server 32. The controller 18 and the controller 22 are connected to each other via a remote copy cable 34, a public line 36, and a remote copy cable 38.

The main center server 28 serves as a computer for sending/receiving information to/from the controller 18 and includes a processor (CPU), an operating system (OS), a memory for storing programs such as application programs, input devices for inputting information, and a display device for displaying information. When sending data to the controller 18, the main center server 28 adds update information to the data and then send them in order to guarantee the data order. This update information is, for example, a time stamp indicating data update time and a sequence number indicating the data update order.

The controller 18 serves as a first controller and includes a plurality of channel processors 40, a plurality of channel processors 42, a plurality of cache memories 44, a plurality of shared memories 46, a plurality of disk processors 48, a plurality of disk processors 50, and a maintenance terminal 52, where these components are connected each other via an internal network 54. Each channel processor 40 is connected via the network 26 to the main center server 28 and also connected to a host computer (not shown). Each channel processor 42 is connected to the remote copy cable 34. Each disk processor 48, 50 is connected to the storage apparatus 20.

The storage apparatus 20 serves as a first storage apparatus for storing data and includes a plurality of disk drives 58.

Each channel processor 40 includes an operating system and application programs, receives commands and data sent from the main center server 28, analyses the received commands, processes data according to the analysis result, and stores the processed data in the cache memory 44. If the data stored in the cache memory 44 is remote copy target data, the channel processor 42 transfers the remote copy target data to the controller 22 via the remote copy cable 34, the public line 36, and the remote copy cable 38.

The disk processors 48, 50 control data input/output to/from each disk drive 58. For example, each disk processor 48, 50 controls read access or write access to the disk drive 58. When doing so, the disk processor 48 stores data that has been temporarily stored in the cache memory 44, in the disk drive 58.

The maintenance terminal 52 includes a processor (CPU), an operating system (OS), a memory for storing programs such as management programs, input devices for inputting information, and a display device for displaying information. The processor can manage the configuration of the disk subsystem 12, for example, the configuration to construct a RAID (Redundant Array of Independent Disks) using the disk drives 58, in accordance with the management programs and as operated by the operator.

The shared memories 46 store, for example, difference management information and a data order management table. The difference management information is, for example, information used when asynchronous remote copying is temporarily stopped, to manage data updated during the stopped state as difference information, from among pieces of data in the storage apparatus 20. The data order management table is a table used to manage whether the data order of the remote copy target data, from among the pieces of data in the storage apparatus 20, is guaranteed or not. The expression "the data order is guaranteed" as herein used means to guarantee that, for example, pieces of data stored in the storage apparatus 20 have been sorted in the updated order and then stored.

The disk drives 58 constituting the storage apparatus 20 form, for example, a RAID group, and physical storage areas are configured as logical primary volume groups. Each primary volume is an access target volume for the main center server 28 or the host computer and, for example, the primary volumes are divided into a plurality of work groups. When storing data in the primary volumes belonging to each work group, each disk processor 48, 50 stores the data in each primary volume in the state where the data order is guaranteed for each work group; and the disk processor 48, 50 stores information indicating whether the data order is guaranteed or not regarding the data belonging to each work group, in the data order management table in the shared memory 46.

Meanwhile, the backup center server 32 serves as a computer for sending/receiving information to/from the controller 22 for the remote site 14 via the network 30 and includes a processor (CPU), an operating system (OS), a memory for storing programs such as application programs, input devices for inputting information, and a display device for displaying information.

The controller 22 for the remote site 14 serves as a second controller and includes a plurality of channel processors 60, a plurality of channel processors 62, a plurality of cache memories 64, a plurality of shared memories 66, a plurality of disk processors 68, a plurality of disk processors 70, and an SVP (SerVice Processor) maintenance terminal 72, and these components are connected to each other via an internal network 74.

Each channel processor 60 is connected to each channel processor 42 via the remote copy cable 38, the public line 36, and the remote copy cable 34. Each channel processor 62 is connected to the backup center server 32 via the network 30 and also connected to the host computer (not shown). Each disk processor 68, 70 is connected to the storage apparatus 24. The maintenance terminal 72 is connected to a hub 78 via a cable 76. The hub 78 is connected to a user open terminal 82 via a cable 80 and also to a data order check display panel 86 via a cable 84.

The storage apparatus 24 constitutes a second storage apparatus for storing data from the controller 18 and a third storage apparatus for storing the data stored in the second storage apparatus as backup data, and includes a plurality of disk drives 88 as storage media. Each disk drive 88 is configured to include a plurality of physical storage areas which are secondary volume groups serving as logical storage areas. Each secondary volume is a volume constituting a pair with the primary volume during remote copying, and the secondary volumes are divided into a plurality of work groups.

Each channel processor 60, 62 includes an operating system and application programs. The channel processor 60 receives the remote copy target data transferred from the controller 18 via the remote copy cable 34, the public line 36, and the remote copy cable 38, processes the received remote copy target data, and stores the processed remote copy target data in the cache memory 64. Meanwhile, the channel processor 62 receives commands and data sent from the backup center server 32, analyses the received commands, processes data according to the analysis result, and stores the processed data in the cache memory 64.

Each disk processor 68, 70 includes an operating system and application programs and controls data input/output to/from each disk drive 88. For example, each disk processor 68, 70 controls data read access or write access to the disk drives 88. When doing so, the disk processor 68 stores data that has been temporarily stored in the cache memory 64, for example, the remote copy target data, in the disk drives 88 in the state where the data order is guaranteed.

The maintenance terminal 72 includes a processor (CPU), an operating system (OS), a memory for storing programs such as management programs, input devices for inputting information, and a display device for displaying information. The processor can manage the configuration of the disk subsystem 16, for example, the configuration to construct a RAID using the disk drives 88, in accordance with the management programs and as operated by the operator.

The shared memories 66 store, for example, difference management information and a data order management table. The difference management information is, for example, information used when asynchronous remote copying is temporarily stopped, to manage data updated during the stopped state, from among pieces of data in the storage apparatus 24. The data order management table is a table used to manage whether the data order of the remote copy target data as difference information, from among the pieces of data in the storage apparatus 24, is guaranteed or not. The expression "the data order is guaranteed" as herein used means to guarantee that, for example, pieces of data stored in the storage apparatus 24 have been sorted in the updated order and then stored.

Next, when managing primary volumes constituted from the disk drives 58 and secondary volumes constituted from the disk drives 88, the channel processors 40, 42, 60, 62 manage the primary volumes and the secondary volumes in accordance with a data order management table T1 shown in FIG. 2 before the occurrence of a disaster, and in accordance with a data order management table T2 shown in FIG. 3 after the occurrence of a disaster.

The channel processors 40, 42 manage primary volumes #1 to #n in association with work groups #0-0, #0-1, and so on up to #n-n, respectively; and the channel processors 60, 62 manage secondary volumes #1 to #n in association with the work groups #0-0, #0-1, and so on up to #n-n, respectively.

The data order management table T1 before the occurrence of a disaster as shown in FIG. 2 is constituted from a "management number" field 100, a "work group number" field 102, a "volume number" field 104, a "volume status" field 106, a "work group status" field 108, and a "READ/WRITE permission status" field 110.

The "management number" field 100 stores numbers such as "1," "2," "3," and so on up to "n" in each entry. The "work group number" field 102 stores the work group number, such as "0-0," "0-1," "1-1," "1-1," "1-2," and so on up to "n-n," for the primary volumes or the secondary volumes. The "volume number" field 104 stores the volume number from "1" to "n" corresponding to the relevant work group from the first entry to the $n^{th}$ entry.

The "volume status" field 106 stores information about whether or not the data order exists regarding each relevant volume, that is, information about whether or not the data order of each relevant volume is guaranteed. If the status has changed from an "uncertain" state to the state where each channel processor 40, 42, 60, 62 judges that the data order exists regarding the relevant volume, information indicating "SUSPENDED GROUP" is stored in the "volume status" field 106; and if each channel processor 40, 42, 60, 62 then judges that the data order does not exist regarding the relevant volume, information indicating "SUSPENDED VOLUME" is stored in the "volume status" field 106. For example, the "volume status" field 106 for volume #4 in the fourth entry stores "SUSPENDED VOLUME" indicating that the status has changed from the "uncertain" state to the state where it is judged that the data order does not exist; and the "volume status" field 106 for the other entries stores "SUSPENDED GROUP" indicating that the status has changed from the "uncertain" state to the state where it is judged that the data order exists.

The "work group status" field 108 stores information about whether the data order of each relevant work group is guaranteed or not. For example, the "work group status" field 108 for work group "0" to which the primary volumes or the secondary volumes belong stores information indicating that the status has changed from the "uncertain" state to the state where it is judged that the data order is guaranteed, i.e., "ORDER-GUARANTEED GROUP."

Moreover, regarding work group "1" to which the primary volumes or the secondary volumes belong, the "volume status" field 108 for volume numbers #3 and #5 shows that the data order exists, but the "volume status" field 108 for volume number #4 shows that the data order does not exists. As a result, the "work group status" field 108 for the entire work group "1" stores information indicating that the status has changed from the "uncertain" state to the state where it is judged that the data order of the group is not guaranteed, i.e., "ORDER-NONGUARANTEED GROUP."

The "READ/WRITE permission status" field 110 stores information indicating that read access or write access to the disk drives 58, 88 is unpermitted. Specifically speaking, since read access or write access cannot be made to the disk drives 88 when performing asynchronous remote copying, the information indicating "unpermitted" is stored.

Next, FIG. 3 shows the configuration of the data order management table T2 after the occurrence of a disaster. The data order management table T2 has the same configuration as that of the data order management table T1. The "management number" field 100, the "work group number" field 102, the "volume number" field 104, the "volume status" field 106, and the "work group status" field 108 store the same pieces of information as those in the data order management table T1, respectively. However, the "READ/WRITE permission status" field 110 stores different information from that in the data order management table T1.

Specifically speaking, access to the secondary volumes whose data order is guaranteed needs to be immediately permitted after the occurrence of a disaster. If the "work group status" field 108 stores information indicating "ORDER-GUARANTEED GROUP," information indicating that the READ/WRITE permission status changes from "UNPERMITTED" to "PERMITTED" is stored in the "READ/WRITE permission status" field 110 so that read access or write access will be permitted for the secondary volumes belonging to this group. For example, the "work group status" field 108 for volume numbers #1 and #2 belonging to the work group "0" stores information indicating "ORDER-GUARANTEED GROUP," so that information indicating that the READ/WRITE permission status changes from "UNPERMITTED" to "PERMITTED" is stored in the "READ/WRITE permission status" field 110.

Figure 4:
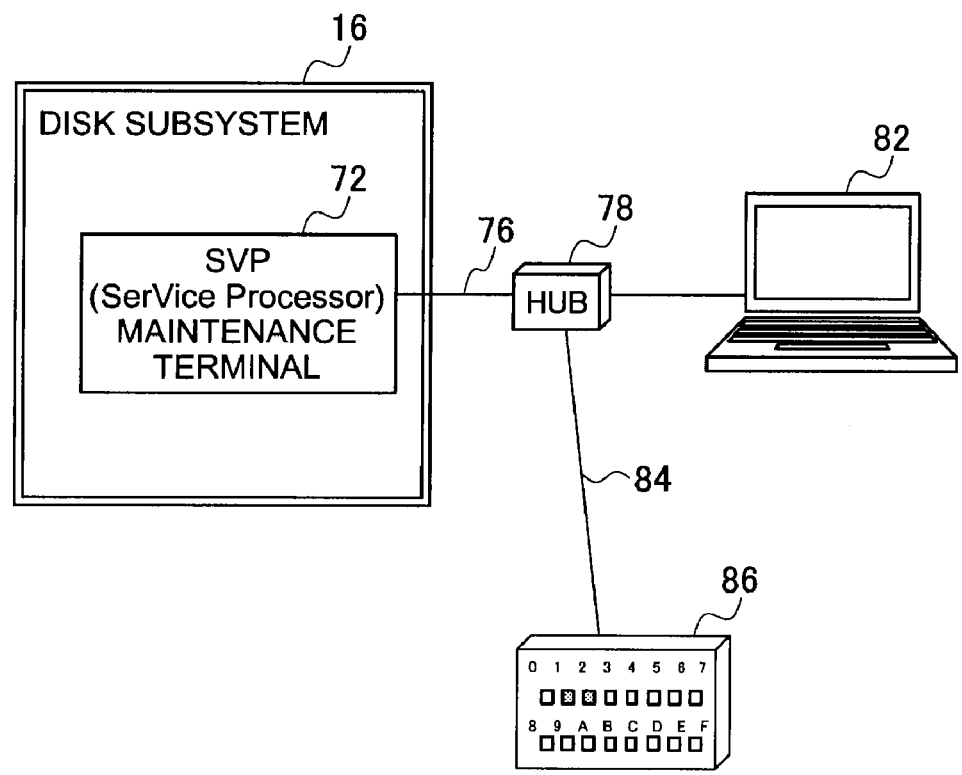
FIG. 4 is a diagram explaining the connection relationship between a disk subsystem and a user management terminal and a display panel.

Information stored in the data order management tables T1, T2 is output from the maintenance terminal 72 via the hub 78 to the user open terminal 82 and the data order check display panel 86 as shown in FIG. 4.

Next, FIG. 5 shows a display example of a remote copy data order check screen 200 that is a display screen for the user open terminal 82. The remote copy data order check screen 200 includes a "work group number" display area 202, an "intended use" display area 204, an "order-guaranteed" display area 206, an "order-nonguaranteed" display area 208, and a "data-guaranteed time" display area 210. The remote copy data order check screen 200 also includes a "work group number" display area 212, an "intended use" display area 214, an "order-guaranteed" display area 216, an "order-nonguaranteed" display area 218, and a "data-guaranteed time" display area 220. Incidentally, the user open terminal 82 which is a display terminal can be configured using, for example, a personal computer.

The "work group number" display areas 202, 212 display work group numbers from "00" to "0F" and from "10" to "1F," respectively. The "intended use" display areas 204, 214 display, for example, "A system backbone," "B system backbone," "A system development," or "B system development," as the intended use of each relevant work group. The "order-guaranteed" display areas 206, 216 display "[Character] indicating "yes"" when the order of data (remote copy target data) belonging to each relevant work group is guaranteed. Also, the "order-nonguaranteed" display areas 208, 218 display "[Character] indicating "yes"" when the order of data (remote copy target data) belonging to each relevant work group is not guaranteed. The "data-guaranteed time" display areas 210, 220 display information about the time and date when the order of data (remote copy target data) belonging to the relevant work group was guaranteed.

Figure 6:
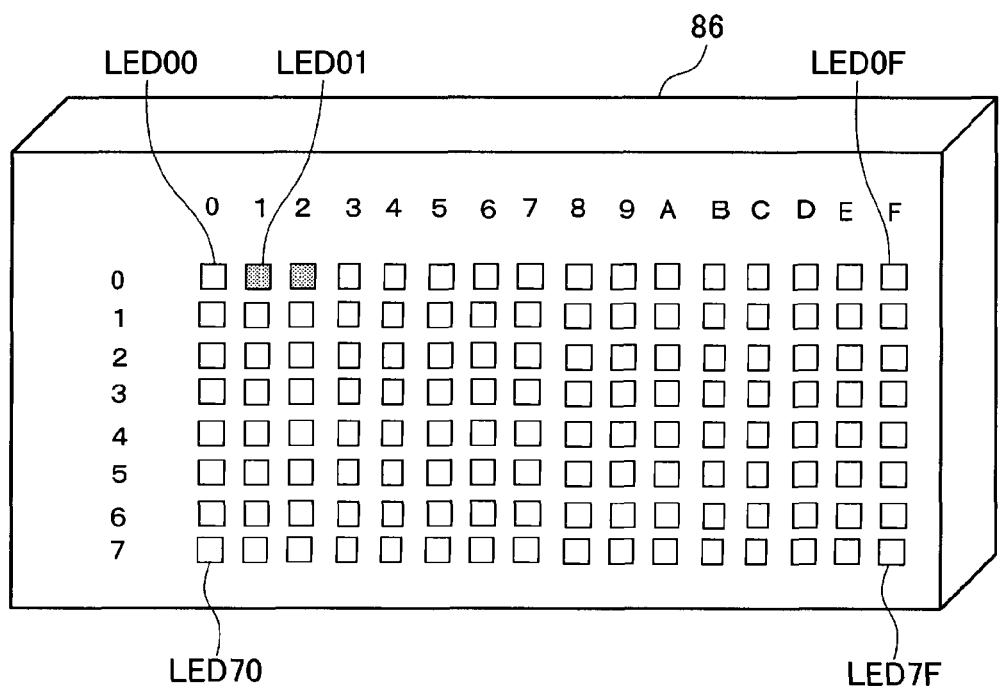
FIG. 6 is an external view of a data order check display panel.

FIG. 6 is an external view of the data order check display panel 86. When there are work groups "00" to "7F," display elements LED00 to LED7F corresponding to the work groups "00" to "7F" are placed on the surface of the display panel 86. Each display element LED00 to LED7F is connected to a display element drive circuit (not shown in the drawing). Each display element LED00 to LED7F lights up in different manners depending on whether the data order of the data (remote copy target data) belonging to each relevant work group is guaranteed or not.

For example, if the data order of the data (remote copy target data) belonging to the relevant work group is guaranteed, each display element LED00 to LED7F lights up in blue; and if the data order of the data (remote copy target data) belonging to the relevant work group is not guaranteed, each display element LED00 to LED7F lights up in red.

Figure 7:
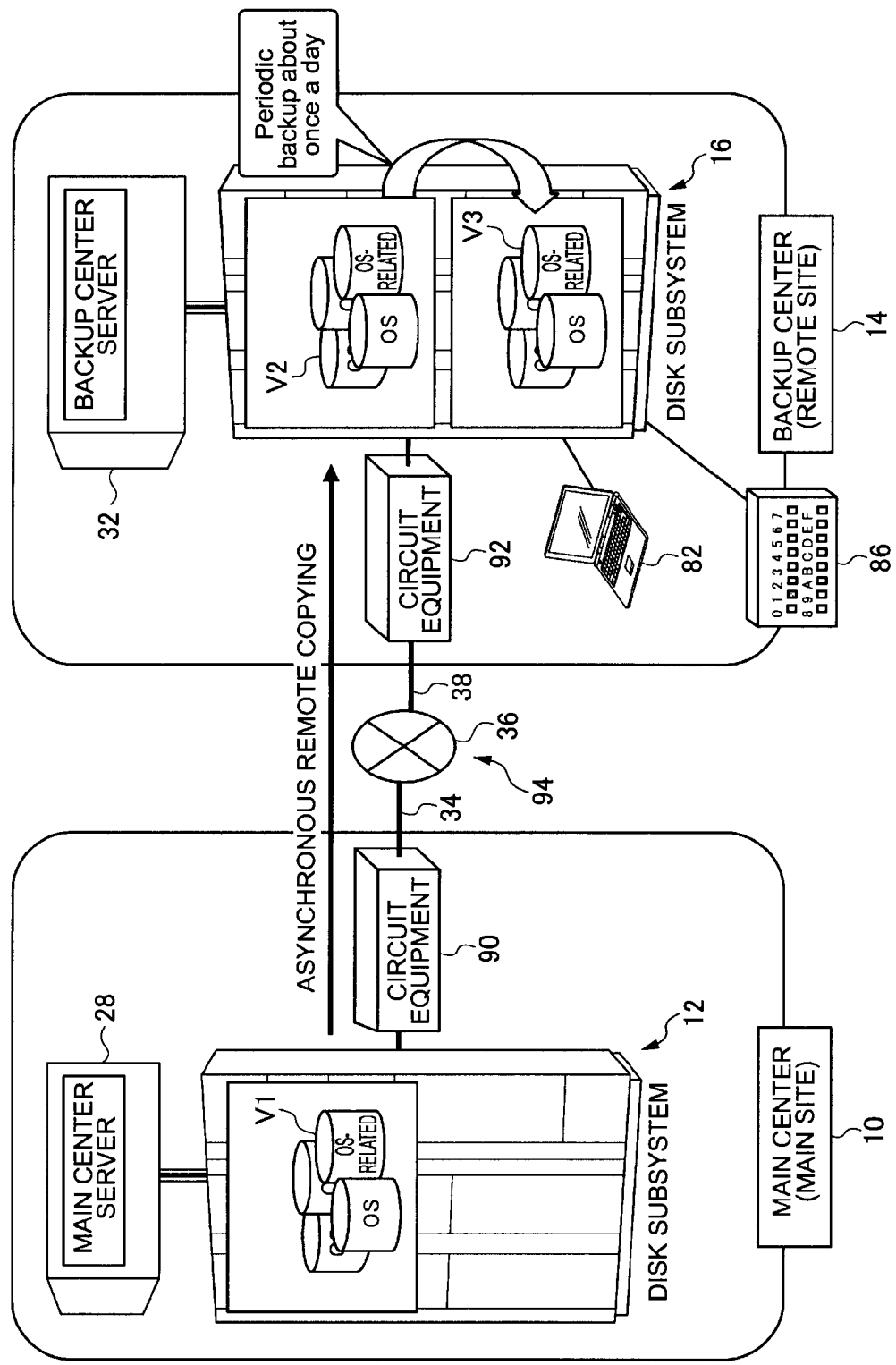
FIG. 7 is a schematic diagram explaining the state where asynchronous remote copying is performed.

When the remote copy system performs asynchronous remote copying between the controller 18 and the controller 22, data is sent and received between the controller 18 and the controller 22 as shown in FIG. 7. The term "asynchronous remote copying" performed between the controller 18 and the controller 22 means that the controller 18 updates data in primary volumes V1 and transfers the updated data as the remote copy target data to the controller 22, and the controller 22 copies the received remote copy target data to secondary volumes V2 not in synchronization with the update timing by the controller 18, that is, asynchronously.

Specifically speaking, the controller 18 extracts the updated data as the remote copy target data from the data in the primary volumes V1 constituted from the disk drives 58 and adds update information including, for example, a time stamp indicating data update time and a sequence number indicating the data update order, to the extracted remote copy target data.

Subsequently, the controller 18 transfers the remote copy target data to which the update information is added, to the controller 22 via a remote copy channel 94 including a circuit equipment 90, the remote copy cable 34, the public line 36, the remote copy cable 38, and a circuit equipment 92.

After receiving the remote copy target data, the controller 22 judges, based on the update information added to the remote copy target data, whether the data order of the remote copy target data is guaranteed or not.

For example, the controller 22 judges whether or not the pieces of remote copy target data have been received in the data update order; and if the pieces of remote copy target data have not been received in the data update order, the controller 22 sorts the received pieces of remote copy target data in the data update order and stores the sorted remote copy target data in the secondary volumes V2 in the state where the data order is guaranteed. In this case, the secondary volumes V2 constituted from the disk drives 88 and the primary volumes V1 make pairs (copy pairs), and the same pieces of data as those in the primary volumes V1 will be stored in the secondary volumes V2.

In the above-described circumstances, the controller 22 stores the data, which was stored in the secondary volumes V2, as backup data in backup volumes V3 periodically about once a day. This processing is executed in the process of batch processing or online processing as shown in FIG. 8.

Figure 8:
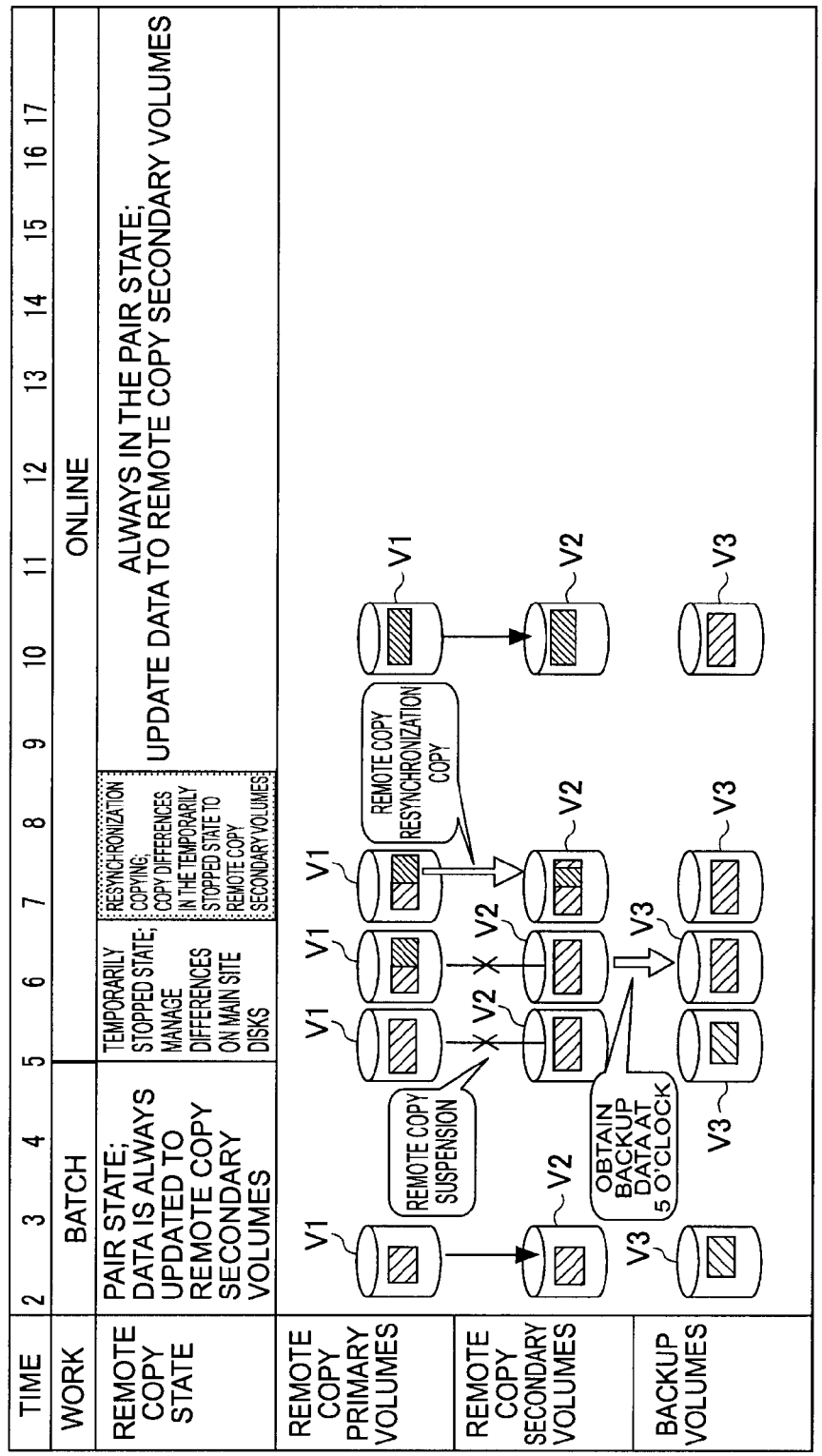
FIG. 8 is a diagram explaining batch processing and online processing in the remote copy system.

Specifically speaking, when the asynchronous remote copying is performed as batch processing between the controller 18 and the controller 22 via the remote copy channel 94 from 2 o'clock to 5 o'clock as shown in FIG. 8, data in the primary volumes V1 is stored in the secondary volumes V2. Subsequently, when the batch processing terminates and online processing starts at 5 o'clock, the asynchronous remote copying is temporarily stopped. When this happens, the controller 18 stores data (difference information) which was updated in the stopped state from among the data in the primary volumes, in the shared memory 46 and manages the data stored in the shared memory 46 as the difference information.

Meanwhile, when the asynchronous remote copying is temporarily stopped, the controller 22 stores the data stored in the secondary volumes V2 as backup data in the backup volumes V3 at 5 o'clock.

Subsequently, when resynchronization copying is started before 7 o'clock, the controller 18 transfers the difference information stored in the shared memory 46 via the remote copy channel 94 to the controller 22. As a result, the controller 22 stores the difference information in the secondary volumes V2. In this case, even if the asynchronous remote copying is temporarily stopped after 5 o'clock, the controller 22 can restore the same data as that of the primary volumes V1 based on the data stored in the secondary volumes V2 by storing the difference information in the secondary volumes V2.

Then, after the resynchronization copying is stopped after 8 o'clock, the asynchronous remote copying is performed between the controller 18 and the controller 22 via the remote copy channel 94, and the data of the primary volumes V1 is stored in the secondary volumes V2.

On the other hand, when the asynchronous remote copying is performed between the controller 18 and the controller 22, the channel processor 42 and the channel processor 60 execute periodic processing, so that the command information including the heart-beat signal is sent and received between the channel processor 42 and the channel processor 60 via the remote copy channel 94. The term "heart-beat signal" herein used means a signal that the channel processor 42 and the channel processor 60 transmit periodically in order to check if the connection with the communication counterpart is effective or not.

Figure 9:
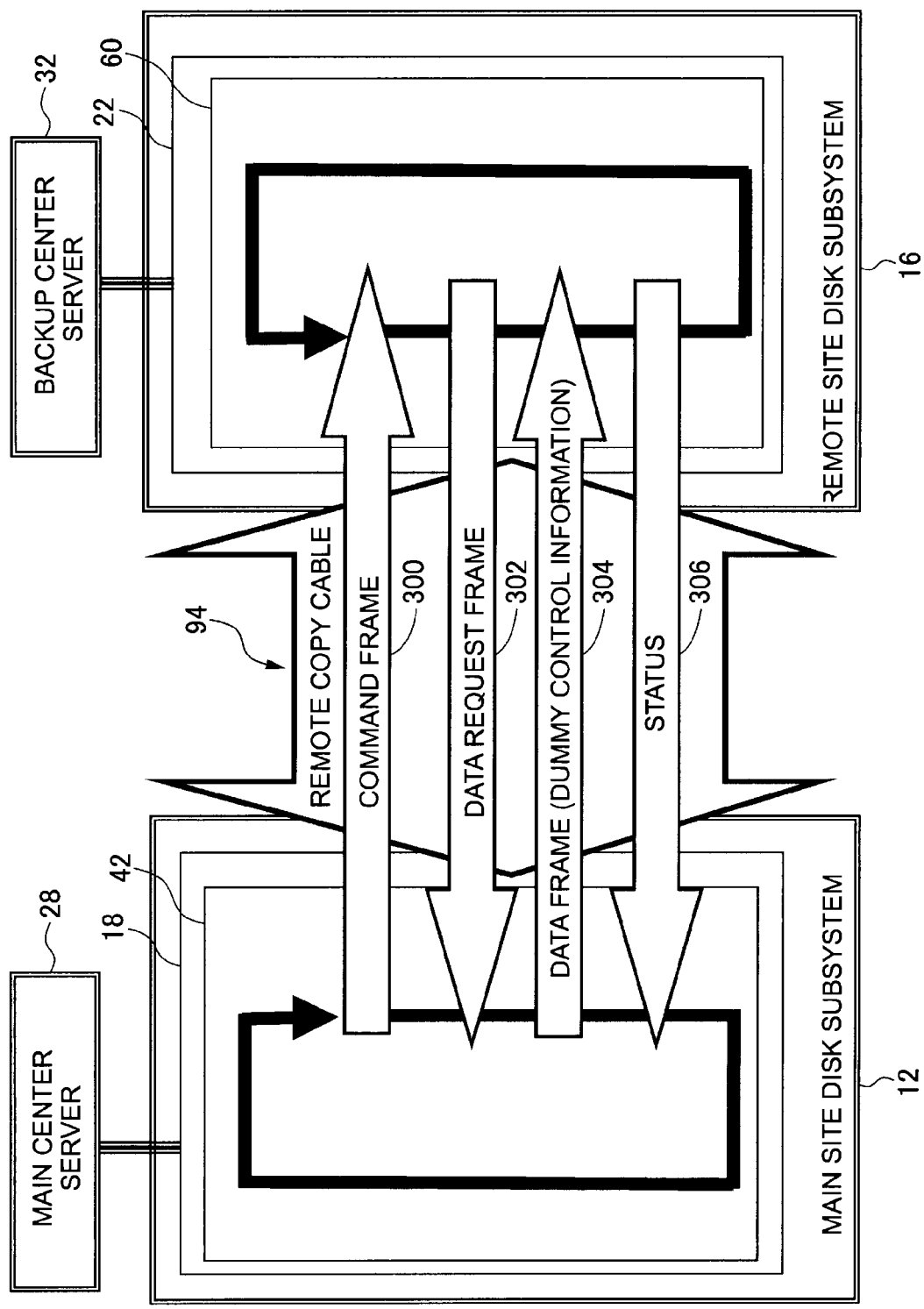
FIG. 9 is a diagram explaining intra-channel-processor periodic processing at a main site and intra-processor periodic processing at a remote site.

Specifically speaking, as shown in FIG. 9, the channel processor 42 sends a command frame 300 as first command information via the remote copy channel 94 to the channel processor 60 as transmission processing at regular intervals, for example, once per second; receives a data request frame 302 sent from the channel processor 60 as second command information in response to the command frame 300; then transmits a data frame (dummy control information) 304 via the remote copy channel 94 to the channel processor 60; and receives the status 306 sent from the channel processor 60 as second command information in response to the data frame 304.

On the other hand, when receiving the command frame 300 as reception processing in the command frame reception wait state, the channel processor 60 sends the data request frame 302, as the second command information in response to the command frame 300, via the remote copy channel 94 to the channel processor 42; and subsequently, when receiving the data frame 304 sent from the channel processor 42, the channel processor 60 sends the status 306, as the second command information in response to the data frame 304, via the remote copy channel 94 to the channel processor 42.

If the channel processor 60 fails to receive the command frame 300 within a set time period, for example, a monitoring time period set by the maintenance terminal 72 in the above-described circumstances, the channel processor 60 outputs information about the occurrence of a disaster at the main site 10 to the channel processor 62 and the backup center server 32 and also to the user open terminal 82, and the intra-channel-processor periodic processing shifts to data order judgment processing.

When a disaster has occurred at the main site 10, the channel processors 60, 62 manage the data order of the remote copy target data using the data order management table T2 instead of the data order management table T1 stored in the shared memory 66.

Figure 10:
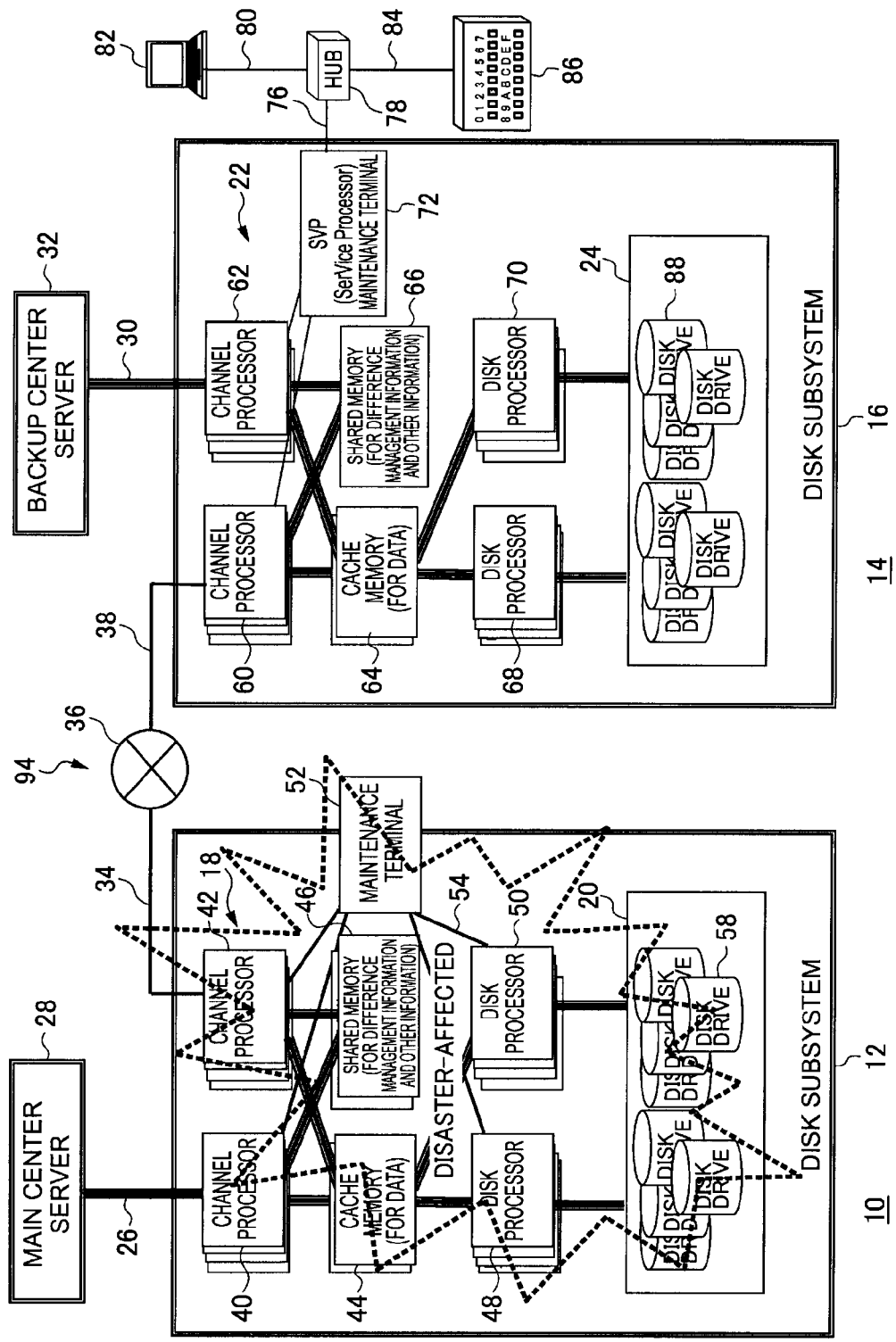
FIG. 10 is a block diagram of the remote copy system in the state where the main site suffers from a disaster.

For example, when a disaster has occurred at the main site 10 as shown in FIG. 10, the channel processor 62 for the controller 22 searches the data order management table T2 to judge whether the data order of each relevant secondary volume V2 is guaranteed or not; and if it is determined that the data order is guaranteed, the channel processor 62 executes processing for changing the READ/WRITE permission status of the relevant secondary volume V2 of each work group from "UNPERMITTED" to "PERMITTED."

When this happens, the channel processor 62 also executes processing for changing the READ/WRITE permission status of the backup volumes V3 from "UNPERMITTED" to "PERMITTED." As a result, at the time of the occurrence of a disaster, the backup center server 32 can immediately start the recovery processing by accessing the data in the secondary volumes V2 or the backup volumes V3.

Also, the channel processor 62 outputs, as an attention report, information about the state transition of the data stored in each secondary volume from the state where the data order is guaranteed to the state where the data order is not guaranteed, or information about the state transition from the state where the data order is not guaranteed to the state where the data order is guaranteed, to the backup center server 32.

Furthermore, the channel processor 62 makes, via the maintenance terminal 72, a GUI (Graphical User Interface) screen for the user open terminal 82 display information indicating whether the data order of data belonging to each work group is guaranteed or not; and also makes the data order check display panel 86 display whether the data order of the data belonging to each work group is guaranteed or not, using the display elements.

If the data order of the data belonging to each work group is guaranteed and the OS (Operating System) is not started in advance, the backup center server 32 starts up a work recovery OS, starts work recovery processing using the data in the secondary volumes V2 belonging to each work group, and resumes the work. In other words, the backup center server 32 restores the disk subsystem 16 to the operating state before the occurrence of the disaster by using the data in the secondary volumes V2 and resumes the work at the disk subsystem 16.

On the other hand, if the data order of the data belonging to each work group is not guaranteed and the OS is not started in advance, the backup center server 32 starts up the OS, starts the work recovery processing using the data in the backup volumes V3, and resumes the work. In other words, the backup center server 32 restores the disk subsystem 16 to the operating state before the occurrence of the disaster by using the data in the backup volumes V3 and resumes the work at the disk subsystem 16.

Next, the intra-channel-processor periodic processing executed at the controller 22 will be explained in accordance with the flowchart of FIG. 11. First, when performing asynchronous remote copying between the controller 18 and the controller 22, the channel processor 60 sends and receives, for example, the command information including the heart-beat signal via the remote copy channel 94 as communication during the asynchronous remote copying and thereby judges whether or not the remote copy communication takes place within a designated time period (monitoring time period) (S1).

If the channel processor 60 determines that the remote copy communication takes place within the designated time period, i.e., the remote copy communication is conducted within the designated time period, the channel processor 60 repeats the processing in step S1; and if the channel processor 60 determines that the remote copy communication does not take place within the designated time period, i.e., the remote copy communication is not conducted within the designated time period, the channel processor 60 determines that a disaster has occurred at the main site 10, and then judges whether or not the data order exists regarding the data belonging to the secondary volumes V2 (S2).

In this case, the channel processor 60 judges whether the data order is guaranteed or not, regarding the data belonging to all the secondary volumes V2; and if the data order is guaranteed, the channel processor 60 concludes that the data order exists, and then sets the status of all the secondary volumes V2 to "SUSPENDED GROUP" (S3).

Next, based on the results of the processing by the channel processor 60, the channel processor 62 gives READ/WRITE permission to the secondary volumes V2 belonging to each work group (S4). As a result, the backup center server 32 can make read access or write access to the secondary volumes V2 belonging to each work group. The processing details in steps S3 and S4 are reflected in the data order management table T2 shown in FIG. 3. Accordingly, the information in the data order management table T2 is updated.

Subsequently, the channel processor 62 outputs information regarding the state transition of the remote copy pairs as an attention report to the backup center server 32 (S5). For example, based on the information stored in the data order management tables T1, T2, the channel processor 62 outputs, as the attention report, information indicating that the state of the secondary volume V2 constituting a pair with the primary volume V1 made the transition from "SUSPENDED VOLUME" to "SUSPENDED GROUP" and information indicating that the state of the secondary volume V2 made the transition from "SUSPENDED GROUP" to "SUSPENDED VOLUME," to the backup center server 32.

Next, the channel processor 62 has the remote copy data order check screen 200 displayed on the GUI screen for the user open terminal 82 (S6). In this case, the mark "[Character] indicating "yes"" in the "order-guaranteed" display area 206, 216 indicates that the data order is guaranteed regarding the relevant secondary volume V2 belonging to each work group; and the "data guaranteed time" display area 210, 220 displays until what time (hours, minutes, and seconds) on what date the data order is guaranteed regarding the secondary volumes V2 belonging to each work group.

At the same time, the channel processor 62 lights up a light-emitting device LED in blue, that corresponds to the work group whose data order is guaranteed, from among light-emitting devices for the display panel 86 (S7).

Subsequently, the channel processor 62 outputs information about the work groups whose data order is guaranteed, based on the information stored in the data order management table T2, to the backup center server 32 and then terminates the processing in this routine.

On the other hand, if it is determined in step S2 that the data order does not exist, that is, if the data order of the data in the secondary volumes V2 belonging to the relevant work group is not guaranteed, the channel processor 62 sets the status of the secondary volumes V2 whose data order cannot be guaranteed, to "SUSPENDED VOLUME," and sets the status of the secondary volumes V2 whose data order can be guaranteed, to "SUSPENDED GROUP" (S9).

Next, the channel processor 62 sends information about the state transition of the remote copy pairs, as the attention report, to the backup center server 32 (S10).

For example, based on the information stored in the data order management tables T1, T2, the channel processor 62 outputs, as the attention report, information indicating that the state of the secondary volume V2 constituting a pair with the primary volume V1 made the transition from "SUSPENDED VOLUME" to "SUSPENDED GROUP" and information indicating that the state of the secondary volume V2 made the transition from "SUSPENDED GROUP" to "SUSPENDED VOLUME," to the backup center server 32.

Then, the channel processor 62 has the remote copy data order check screen 200 displayed on the GUI screen for the user open terminal 82 (S11). In this case, the mark "[Character] indicating "yes"" in the "order-nonguaranteed" display area 208, 218 indicates that the data order is not guaranteed regarding data of the relevant secondary volume V2 belonging to each work group.

Subsequently, the channel processor 62 has the display panel 86 display that the data order is not guaranteed regarding the secondary volumes V2 belonging to each work group. In this case, the light-emitting device LED with the number corresponding to the work group whose data order is not guaranteed lights up in red.

Next, the channel processor 62 outputs information about the work groups whose data order is not guaranteed, based on the information stored in the data order management table T2, to the backup center server 32 and then terminates the processing in this routine.

Meanwhile, if the backup center server 32 receives, from the channel processor 62, information indicating that the data order is guaranteed regarding the secondary volumes V2 belonging to each work group, the backup center server 32 starts work recovery processing based on the data in the secondary volumes V2. In this case, since the controller 22 permits data input/output to/from the secondary volumes V2 at the time of the occurrence of a disaster, the backup center server 32 can immediately starts the work recovery processing based on the data in the secondary volumes V2.

Furthermore, if the backup center server 32 receives, from the channel processor 62, information indicating that the data order is not guaranteed regarding the secondary volumes V2 belonging to each work group, the backup center server 32 starts the work recovery processing based on the data in the backup volumes V3. In this case, since the controller 22 permits data input/output to/from the backup volumes V3 at the time of the occurrence of a disaster, the backup center server 32 can immediately starts the work recovery processing based on the data in the backup volumes V3.

Once the backup center server 32 starts the work recovery processing, the main center server 28 and the controllers 18, 22 resume the work.

Incidentally, if the controller 22 does not immediately give permission to input/output data to/from the secondary volumes V2 or the backup volumes V3 when a disaster has occurred, the operator can give the permission to input/output data to/from the secondary volumes V2 or the backup volumes V3 by, for example, operating the maintenance terminal 72. In this case, subject to the permission of data input/output to/from the secondary volumes V2 or the backup volumes V3, the backup center server 32 can start the work recovery processing using the data in the secondary volumes V2 or the backup volumes V3.

When asynchronous remote copying is performed between the controller 18 and the controller 22 according to this embodiment, the controller 18 transfers the command information and the remote copy target data stored in the primary volumes V1, via the remote copy channel 94 to the controller 22; and when the controller 22 receives the command information within the set time period and also receives the remote copy target data, the controller 22 stores the remote copy target data in the secondary volumes V2; and if the controller 22 fails to receive the command information within the set time period, it judges that a disaster has occurred at the main site 10, and then outputs this judgment result to the backup center server 32; and if the judgment result indicating that the disaster has occurred is input, the backup center server 32 executes the recovery processing based on the data in the secondary volumes V2 or the backup volumes V3.

According to this embodiment, the occurrence of a disaster at the main site 10 can be detected at the remote site 14; and when a disaster is detected, the recovery processing can be started at the remote site 14.

As a result, the work can be resumed at the remote site 14 without having the operator at the backup center perform cumbersome and complicated operation, and it is possible to reduce the time it takes to resume the work after the occurrence of a disaster.

Moreover, since according to this embodiment the controller 22 gives permission to input/output data to/from the secondary volumes V2 or the backup volumes V3 when a disaster has occurred at the main site 10, the backup center server 32 can immediately start the work recovery processing using data in the secondary volumes V2 or the backup volumes V3.

When this happens, the work recovery can be executed depending on whether the data order exists or not. Specifically speaking, if the data order is guaranteed regarding the secondary volumes V2 belonging to each work group, the work recovery processing is immediately executed based on the data in the secondary volumes V2; and if the data order is not guaranteed regarding the secondary volumes V2 belonging to each work group, the work recovery processing can be immediately executed based on data whose data order is guaranteed, from among the data in the backup volumes V3.

Incidentally, even if the operation by the operator is required as a condition for the permission of data input/output to/from the secondary volumes V2 or the backup volumes V3, if the operator confirms the occurrence of a disaster at the main site 10 using the user open terminal 82 and/or the display panel 86 and then performs necessary operation to permit data input/output to/from the secondary volumes V2 or the backup volumes V3, the backup center server 32 can immediately start the work recovery processing, using the data in the secondary volumes V2 or the backup volumes V3.

REFERENCE SIGNS LIST

10 main site
12 disk subsystem
14 remote site
16 disk subsystem
18 controller
20 storage apparatus
22 controller
24 storage apparatus
40, 42 channel processors
44 cache memory
46 shared memory
48, 50 disk processors
58 disk drive
60, 62 channel processors
64 cache memory
66 shared memory
68, 70 disk processors
82 user open terminal
86 data order check display panel
88 disk drive
94 remote copy channel

The invention claimed is:

1. A remote copy system comprising:
   a first storage subsystem located at a main site for sending/receiving information to/from a main site server; and
   a second storage subsystem located at a remote site for sending/receiving information to/from a backup center server;
   wherein the first storage subsystem includes a first storage apparatus for storing data and a first controller for controlling data input/output to/from the first storage apparatus;
   wherein the second storage subsystem includes a second storage apparatus for storing data from the first controller, a third storage apparatus for storing, as backup data, the data in the second storage apparatus, and a second controller for controlling data input/output to/from the second storage apparatus and transferring the data stored in the second storage apparatus, as the backup data, to the third storage apparatus;
   wherein when asynchronous remote copying is performed, the first controller transfers remote copy target data from among data in the first storage apparatus via a remote copy channel to the second controller and also transfers first command information including a heart-beat signal via the remote copy channel to the second controller;
   wherein when having received the remote copy target data via the remote copy channel, the second controller stores the received remote copy target data in the second storage apparatus; and when having received the first command information via the remote copy channel, the second controller transfers second command information, as information in response to the first command information, via the remote copy channel to the first controller; and if the second controller fails to receive the first command information within a set time period, it judges that a disaster has occurred, and then sends a judgment result to the backup center server; and
   wherein if the judgment result indicating the occurrence of the disaster is input from the second controller, the backup center server sends/receives information to/from the second controller and executes recovery processing.

2. The remote copy system according to claim 1, wherein the first controller manages storage areas in the first storage apparatus as primary volumes constituting logical storage areas, manages the primary volumes by dividing them into a plurality of groups, transfers data belonging to each primary volume, as the remote copy target data, to the second controller, adds update information about an update order of the remote copy target data to the remote copy target data for each group, and transfers the remote copy target data with the update information to the second controller;
   wherein the second controller manages storage areas in the second storage apparatus as secondary volumes constituting logical storage areas, manages the secondary volumes by dividing them into a plurality of groups, judges for each group whether a data order of the received remote copy target data is guaranteed or not, based on the update information added to the remote copy target data, outputs a judgment result indicating whether the data order is guaranteed or not, to the backup center server, a display terminal, and a data order check panel, and then permits the backup center server to input/output data to/from the second storage apparatus and the third storage apparatus when outputting the judgment result indicating the occurrence of the disaster to the backup center server;

wherein if the judgment result indicating that the data order of the received remote copy target data is guaranteed is input from the second controller, the backup center server executes the recovery processing based on data stored in the second storage apparatus; and if the judgment result indicating that the data order of the received remote copy target data is not guaranteed is input from the second controller, the backup center server executes the recovery processing based on data stored in the third storage apparatus;

wherein the display terminal displays, for each group, whether the data order of the received remote copy target data is guaranteed or not; and wherein if the data order of the received remote copy target data is guaranteed, the data order check panel lights up a display element that corresponds to the group whose data order is guaranteed, from among a plurality of display elements (LEDs) placed corresponding to the groups respectively; and if the data order of the received remote copy target data is not guaranteed, the data order check panel lights up, from among the plurality of display elements (LEDs), a display element that corresponds to the group whose data order is not guaranteed, in color different from that of the display element corresponding to the group whose data order is guaranteed.

3. The remote copy system according to claim 1, wherein the first controller adds update information about an update order of the remote copy target data to the remote copy target data and transfers the remote copy target data with the update information to the second controller;

wherein the second controller judges, based on the update information added to the remote copy target data, whether a data order of the received remote copy target data is guaranteed or not; and the second controller then outputs the judgment result indicating whether the data order is guaranteed or not, to the backup center server; and when outputting the judgment result indicating the occurrence of the disaster to the backup center server, the second controller permits the backup center server to input/output data to/from the second storage apparatus and the third storage apparatus; and wherein if the judgment result indicating that the data order of the received remote copy target data is guaranteed is input from the second controller, the backup center server executes the recovery processing based on data stored in the second storage apparatus; and if the judgment result indicating that the data order of the received remote copy target data is not guaranteed is input from the second controller, the backup center server executes the recovery processing based on data stored in the third storage apparatus.

4. The remote copy system according to claim 1, wherein the first controller adds update information about an update order of the remote copy target data to the remote copy target data and transfers the remote copy target data with the update information to the second controller;

wherein the second controller judges, based on the update information added to the remote copy target data, whether a data order of the received remote copy target data is guaranteed or not; and the second controller then outputs the judgment result indicating whether the data order is guaranteed or not, to a display terminal; and wherein the display terminal displays whether the data order of the received remote copy target data is guaranteed or not.

5. The remote copy system according to claim 1, wherein the first controller adds update information about an update order of the remote copy target data to the remote copy target data and transfers the remote copy target data with the update information to the second controller;

wherein the second controller judges, based on the update information added to the remote copy target data, whether a data order of the received remote copy target data is guaranteed or not; and the second controller then outputs a judgment result indicating whether the data order is guaranteed or not, to a data order check panel; and wherein if the data order of the received remote copy target data is guaranteed, the data order check panel lights up a display element (LED) in a display manner showing that the data order is guaranteed; and if the data order of the received remote copy target data is not guaranteed, the data order check panel lights up the display element (LED) in a display manner showing that the data order is not guaranteed.

6. The remote copy system according to claim 1, wherein the first controller manages storage areas in the first storage apparatus as primary volumes constituting logical storage areas, manages the primary volumes by dividing them into a plurality of groups, transfers data belonging to each primary volume, as the remote copy target data, to the second controller, adds update information about an update order of the remote copy target data to the remote copy target data for each group, and transfers the remote copy target data with the update information to the second controller;

wherein the second controller manages storage areas in the second storage apparatus as secondary volumes constituting logical storage areas, manages the secondary volumes by dividing them into a plurality of groups, judges for each group whether a data order of the received remote copy target data is guaranteed or not, based on the update information added to the remote copy target data, outputs the judgment result indicating whether the data order is guaranteed or not, to the backup center server, and then permits the backup center server to input/output data to/from the second storage apparatus and the third storage apparatus when outputting the judgment result indicating the occurrence of the disaster to the backup center server; and wherein if the judgment result indicating that the data order of the received remote copy target data is guaranteed is input from the second controller, the backup center server executes the recovery processing based on data stored in the second storage apparatus; and if the judgment result indicating that the data order of the received remote copy target data is not guaranteed is input from the second controller, the backup center server executes the recovery processing based on data stored in the third storage apparatus.

7. The remote copy system according to claim 1, wherein the first controller manages storage areas in the first storage apparatus as primary volumes constituting logical storage areas, manages the primary volumes by dividing them into a plurality of groups, transfers data belonging to each primary volume, as the remote copy target data, to the second controller, adds update information about an update order of the remote copy target data to the remote copy target data for each group, and transfers the remote copy target data with the update information to the second controller;

wherein the second controller manages storage areas in the second storage apparatus as secondary volumes constituting logical storage areas, manages the secondary volumes by dividing them into a plurality of groups, judges for each group whether a data order of the received remote copy target data is guaranteed or not, based on the update information added to the remote copy target data, outputs a judgment result indicating whether the data order is guaranteed or not, to a display terminal; and wherein the display terminal displays, for each group, whether the data order of the received remote copy target data is guaranteed or not.

8. The remote copy system according to claim 1, wherein the first controller manages storage areas in the first storage apparatus as primary volumes constituting logical storage areas, manages the primary volumes by dividing them into a plurality of groups, transfers data belonging to each primary volume, as the remote copy target data, to the second controller, adds update information about an update order of the remote copy target data to the remote copy target data for each group, and transfers the remote copy target data with the update information to the second controller;

wherein the second controller manages storage areas in the second storage apparatus as secondary volumes constituting logical storage areas, manages the secondary volumes by dividing them into a plurality of groups, judges for each group whether a data order of the received remote copy target data is guaranteed or not, based on the update information added to the remote copy target data, outputs the judgment result indicating whether the data order is guaranteed or not, to a data order check panel; and wherein if the data order of the received remote copy target data is guaranteed, the data order check panel lights up a display element indicating that the data order is guaranteed, from among a plurality of display elements (LEDs) placed corresponding to the groups respectively; and if the data order of the received remote copy target data is not guaranteed, the data order check panel lights up, from among the plurality of display elements (LEDs), a display element indicating that the data order is not guaranteed.

9. A remote copy method for performing asynchronous remote copying between a first controller for a first storage subsystem and a second controller for a second storage subsystem, the first storage subsystem located at a main site for sending/receiving information to/from a main site server and the second storage subsystem located at a remote site for sending/receiving information to/from a backup center server;

wherein the first storage subsystem includes a first storage apparatus for storing data and the first controller for controlling data input/output to/from the first storage apparatus;

wherein the second storage subsystem includes a second storage apparatus for storing data from the first controller, a third storage apparatus for storing, as backup data, the data in the second storage apparatus, and the second controller for controlling data input/output to/from the second storage apparatus and transferring the data stored in the second storage apparatus, as the backup data, to the third storage apparatus;

wherein when asynchronous remote copying is performed between the first controller and the second controller, the first controller executes the steps of:

transferring remote copy target data from among data in the first storage apparatus via a remote copy channel to the second controller; and transferring first command information including a heart-beat signal via the remote copy channel to the second controller;

the second controller executes the steps of:

when having received the remote copy target data via the remote copy channel, storing the received remote copy target data in the second storage apparatus;

when having received the first command information via the remote copy channel, transferring second command information, as information in response to the first command information, via the remote copy channel to the first controller;

judging that a disaster has occurred if the second controller fails to receive the first command information within a set time period; and sending a judgment result in the above step to the backup center server; and the backup center server executes the step of sending/receiving information to/from the second controller and executes recovery processing if the judgment result indicating the occurrence of the disaster is input from the second controller.

10. The remote copy method according to claim 9, wherein the first controller executes the step of adding update information about an update order of the remote copy target data to the remote copy target data and transferring the remote copy target data with the update information to the second controller;

wherein the second controller executes the steps of:

judging, based on the update information added to the remote copy target data, whether a data order of the received remote copy target data is guaranteed or not;

outputting a judgment result obtained in the above step indicating whether the data order is guaranteed or not, to the backup center server; and permitting the backup center server to input/output data to/from the second storage apparatus and the third storage apparatus when outputting the judgment result indicating the occurrence of the disaster to the backup center server; and wherein the backup center server executes the steps of:

executing the recovery processing based on data stored in the second storage apparatus if the judgment result indicating that the data order of the received remote copy target data is guaranteed is input from the second controller; and executing the recovery processing based on data stored in the third storage apparatus if the judgment result indicating that the data order of the received remote copy target data is not guaranteed is input from the second controller.

11. The remote copy method according to claim 9, wherein the first controller executes the step of adding update information about an update order of the remote copy target data to the remote copy target data and transferring the remote copy target data with the update information to the second controller;

wherein the second controller executes the steps of:

judging, based on the update information added to the remote copy target data, whether a data order of the received remote copy target data is guaranteed or not; and outputting a judgment result obtained in the above step indicating whether the data order is guaranteed or not, to the display terminal; and wherein the display terminal executes the step of displaying whether the data order of the received remote copy target data is guaranteed or not.

12. The remote copy method according to claim 9, wherein the first controller executes the step of adding update information about an update order of the remote copy target data to the remote copy target data and transferring the remote copy target data with the update information to the second controller;

wherein the second controller executes the steps of:
 judging, based on the update information added to the remote copy target data, whether a data order of the received remote copy target data is guaranteed or not; and
 outputting a judgment result indicating whether the data order is guaranteed or not, to a data order check panel; and wherein the data order check panel executes the steps of:
 lighting up a display element (LED) in a display manner showing that the data order is guaranteed if the data order of the received remote copy target data is guaranteed; and
 lighting up the display element (LED) in a display manner showing that the data order is not guaranteed if the data order of the received remote copy target data is not guaranteed.

13. The remote copy method according to claim 9, wherein the first controller executes the steps of:
 managing storage areas in the first storage apparatus as primary volumes constituting logical storage areas and managing the primary volumes by dividing them into a plurality of groups; and
 transferring data belonging to each primary volume, as the remote copy target data, to the second controller, adding update information about an update order of the remote copy target data to the remote copy target data for each group, and transferring the remote copy target data with the update information to the second controller;

wherein the second controller executes the steps of:
 managing storage areas in the second storage apparatus as secondary volumes constituting logical storage areas and managing the secondary volumes by dividing them into a plurality of groups;
 judging for each group whether a data order of the received remote copy target data is guaranteed or not, based on the update information added to the remote copy target data;
 outputting a judgment result indicating whether the data order is guaranteed or not, to the backup center server; and
 permitting the backup center server to input/output data to/from the second storage apparatus and the third storage apparatus when outputting the judgment result indicating the occurrence of the disaster to the backup center server; and wherein the backup center server executes the steps of:
 executing the recovery processing based on data stored in the second storage apparatus if the judgment result indicating that the data order of the received remote copy target data is guaranteed is input from the second controller; and
 executing the recovery processing based on data stored in the third storage apparatus if the judgment result indicating that the data order of the received remote copy target data is not guaranteed is input from the second controller.

* * * * *